(No Model.)

P. D. DERICKX.
HARNESS.

No. 468,796. Patented Feb. 16, 1892.

WITNESSES

INVENTOR
Paul D. Derickx

UNITED STATES PATENT OFFICE.

PAUL D. DERICKX, OF DETROIT, MICHIGAN.

HARNESS.

SPECIFICATION forming part of Letters Patent No. 468,796, dated February 16, 1892.

Application filed September 18, 1891. Serial No. 406,156. (No model.)

*To all whom it may concern:*

Be it known that I, PAUL D. DERICKX, a citizen of the United States, residing at Detroit, in the county of Wayne and State of Michigan, have invented a new and useful Improvement in Harnesses, of which the following is a specification.

The crupper, which is made to hold the saddle in proper place on the animal, frequently, by rubbing sores, chafes the latter's tail, which is caused by the swinging movements of its head or tail; and the object of my invention is to provide the crupper with a tail-shield attachment to prevent the crupper from rubbing on the tail, and thus prevent soreness and chafing on the latter. I attain this object by the means illustrated in the accompanying drawings, in which—

Figure 3:
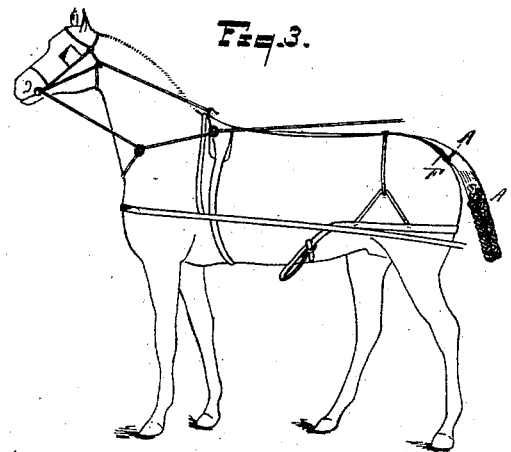
Figure 1:
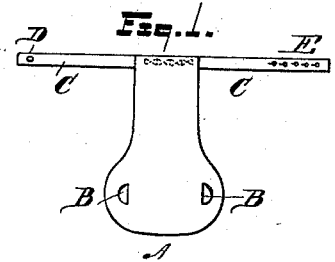
Figure 2:
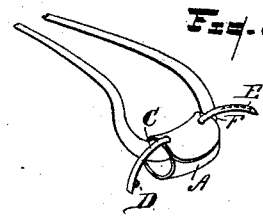
Figure 4:
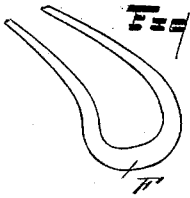

Figure 1 is a perspective view of the tail-shield attachment; Fig. 2, a detailed view of the shield in union with the crupper as it appears ready for use; Fig. 3, a sectional view of the shield attachment, in combination with the harness as it appears on the animal after adjustment; Fig. 4, a perspective view of the crupper.

Similar letters refer to similar parts throughout the said views.

The tail-shield A is made to encircle the lower part of the crupper F, as shown in Fig. 2, and is provided with apertures B B (see Fig. 1) to receive the strap C, made to encircle the root of the tail and provided with a button D and button-holes E for fastening and adjusting it to the crupper and tail, as shown in Figs. 2 and 3. The tail-shield is attached to the crupper by banding it around the latter and drawing the ends of the strap C through the apertures B B, as shown in Fig. 2. That portion of the shield which is bound around the crupper is made sufficiently large to afford a recess for the crupper, so that the latter can move freely between it and so that when the animal swings or moves its head or tail the crupper rubs on the tail-shield instead of on the tail, and thus prevents chafing the latter. The tail-shield attachment may also be used for tying up the tail to prevent it from getting wet, as also shown in Fig. 3.

A United States patent, No. 369,322, was granted to me September 6, 1887, for a crupper having a strap to encircle the root of the tail, said strap being adapted to hold the crupper to the tail to prevent it slacking and thus prevent friction. I therefore do not again claim, broadly, the means of the strap encircling the root of the tail; but

What I claim, and desire to secure by Letters Patent, is—

In combination with a crupper, a tail-shield A, made as shown and provided with apertures B B, and a strap C, secured to the top thereof and adapted to encircle the root of the tail, having a button D and button-holes E, all for fastening and adjusting the said shield to the crupper and tail, substantially as shown, and for the purpose specified.

PAUL D. DERICKX.

Witnesses:
SAMUEL E. THOMAS,
JULIUS P. JAEGER.